US012755406B2

(12) United States Patent
Rodrigues et al.

(10) Patent No.: US 12,755,406 B2
(45) Date of Patent: Oct. 6, 2026

(54) IMAGE MATCHING APPARATUS, CONTROL METHOD, AND NON-TRANSITORY COMPUTER-READABLE STORAGE MEDIUM

(71) Applicant: NEC Corporation, Tokyo (JP)

(72) Inventors: Royston Rodrigues, Tokyo (JP); Masahiro Tani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 312 days.

(21) Appl. No.: 18/580,038

(22) PCT Filed: Sep. 30, 2021

(86) PCT No.: PCT/JP2021/036063
§ 371 (c)(1),
(2) Date: Jan. 17, 2024

(87) PCT Pub. No.: WO2023/053317
PCT Pub. Date: Apr. 6, 2023

(65) Prior Publication Data
US 2024/0338927 A1 Oct. 10, 2024

(51) Int. Cl.
*G06T 3/14* (2024.01)
*G06T 7/33* (2017.01)
(Continued)

(52) U.S. Cl.
CPC ............ *G06V 10/761* (2022.01); *G06T 11/60* (2013.01); *G06V 10/44* (2022.01)

(58) Field of Classification Search
USPC ........ 382/106, 154–159, 190–218, 276–294; 701/408–519; 706/1–62, 900–903
See application file for complete search history.

(56) References Cited

U.S. PATENT DOCUMENTS 8,761,457 B1 * 6/2014 Seitz .......................... G06T 3/14 382/113
11,032,527 B2 * 6/2021 Schick ................. H04N 9/3173
(Continued)

FOREIGN PATENT DOCUMENTS

JP 2009-122315 A 6/2009

OTHER PUBLICATIONS

Tsung-Yi Lin; Learning Deep Representations for Ground-to-Aerial Geolocalization (Year: 2015).*
(Continued)

*Primary Examiner* — Marcellus J Augustin
(74) *Attorney, Agent, or Firm* — Sughrue Mion, PLLC

(57) ABSTRACT

An image matching apparatus (2000) acquires a ground-view image (20), an aerial-view image (30), a ground depth image (40), and an aerial depth image (50). The ground depth image (40) indicates distance from a ground camera to each location captured in the ground-view image (20). The aerial depth image (50) indicates distance from a center location captured in the aerial-view image to each location captured in the aerial-view image (50). The image matching apparatus (2000) extracts features from the ground-view image and the ground depth image to compute ground feature (60), and extract features from the aerial-view image and the aerial depth image to compute aerial feature (70). The image matching apparatus (2000) determines whether or not the ground-view image (20) and the aerial-view image (30) match each other using the ground feature (60) and the aerial feature (70).

17 Claims, 9 Drawing Sheets

(51) Int. Cl.

*G06T 11/60* (2006.01)
*G06V 10/44* (2022.01)
*G06V 10/74* (2022.01)

(56) References Cited

U.S. PATENT DOCUMENTS

| | | | | |
|---|---|---|---|---|
| 2014/0184585 | A1* | 7/2014 | Unger | G06T 19/20<br>345/419 |
| 2021/0155249 | A1* | 5/2021 | Large | G06V 20/588 |

OTHER PUBLICATIONS

International Search Report for PCT Application No. PCT/JP2021/036063, mailed on Dec. 14, 2021.

Liu Liu and Hongdong Li, "Lending Orientation to Neural Networks for Cross-view Geo-localization", Mar. 29, 2019, <arXiv, https://arxiv.org/pdf/1903.12351>, pp. 4321-4330.

Zhengqi Li and Noah Snavely, "MegaDepth: Learning Single-View Depth Prediction from Internet Photos", Apr. 2, 2018, <arXiv, https://arxiv.org/pdf/1804.00607>, pp. 1-10.

Sixing Hu et al, "CVM-Net: Cross-View Matching Network for Image-Based Ground-to-Aerial Geo-Localization", Proceedings of the IEEE Conference on Computer Vision and Pattern Recognition 2018, Jun. 18, 2018, p. 7258-7267.

Tsung-Yi Lin et al, "Learning Deep Representations for Ground-to-Aerial Geolocalization", Proceedings of the IEEE Conference on Computer Vision and Pattern Recognition 2015, Jun. 7, 2015, p. 5007-5015.

Royston Rodrigues, Masahiro Tani, "Are These from the Same Place? Seeing the Unseen in Cross-View Image Geo- Localization", Proceedings of the IEEE/CVF Winter Conference on Applications of Computer Vision (WACV), 2021, Jan. 5, 2021, p. 3753-3761.

Japanese Office Action for JP Application No. 2024-516837 mailed on Jan. 7, 2025 with English Translation.

* cited by examiner

IMAGE MATCHING APPARATUS, CONTROL METHOD, AND NON-TRANSITORY COMPUTER-READABLE STORAGE MEDIUM

This application is a National Stage Entry of PCT/JP2021/036063 filed on Sep. 30, 2021, the contents of all of which are incorporated herein by reference, in their entirety.

TECHNICAL FIELD

The present disclosure generally relates to image matching, in particular, matching between a ground-view image and an aerial-view image.

BACKGROUND ART

A computer system that performs ground-to-aerial cross-view matching (matching between a ground-view image and an aerial-view image) has been developed. For example, NPL1 discloses a system comprising a set of CNNs (Convolutional Neural Networks) to match a ground-view image against an aerial-view image. Specifically, one of the CNNs acquires a set of a ground-view image and orientation maps that indicate orientations (azimuth and altitude) for each location captured in the ground-view image, and extracts features therefrom. The other one acquires a set of an aerial-view image and orientation maps that indicate orientations (azimuth and range) for each location captured in the aerial-view image, and extracts features therefrom. Then, the system determines whether the ground-view image matches the aerial-view image based on the extracted features.

CITATION LIST

Non Patent Literature

NPL1: Liu Liu and Hongdong Li, "Lending Orientation to Neural Networks for Cross-view Geo-localization", [online], Mar. 29, 2019, [retrieved on 2021 Sep. 24], retrieved from <arXiv, https://arxiv.org/pdf/1903.12351>

NPL2: Zhengqi Li and Noah Snavely, "MegaDepth: Learning Single-View Depth Prediction from Internet Photos", [online], Apr. 2, 2018, [retrieved on 2021 Sep. 24], retrieved from <arXiv, https://arxiv.org/pdf/1804.00607>

SUMMARY OF INVENTION

Technical Problem

In NPL1, it is not considered to extract features from images other than RGB images or their orientation maps. An objective of the present disclosure is to provide a novel technique to determine whether or not a ground-view image and an aerial-view image match each other.

Solution to Problem

The present disclosure provides a training apparatus that comprises at least one processor and at least one memory storing instructions. The at least one processor is configured to execute the instructions to: acquire a ground-view image, an aerial-view image, a ground depth image, and an aerial depth image, the ground depth image being an image that indicates distance from a ground camera to each location captured in the ground-view image, the aerial depth image being an image that indicates distance from a center location captured in the aerial-view image to each location captured in the aerial-view image, extract features from the ground-view image and the ground depth image to compute ground feature; extract features from the aerial-view image and the aerial depth image to compute aerial feature; and determine whether or not the ground-view image and the aerial-view image match each other using the ground feature and the aerial feature.

The present disclosure further provides a control method that is performed by a computer. The control method comprises: acquiring a ground-view image, an aerial-view image, a ground depth image, and an aerial depth image, the ground depth image being an image that indicates distance from a ground camera to each location captured in the ground-view image, the aerial depth image being an image that indicates distance from a center location captured in the aerial-view image to each location captured in the aerial-view image, extracting features from the ground-view image and the ground depth image to compute ground feature; extracting features from the aerial-view image and the aerial depth image to compute aerial feature; and determining whether or not the ground-view image and the aerial-view image match each other using the ground feature and the aerial feature.

The present disclosure further provides a non-transitory computer readable storage medium storing a program. The program that causes a computer to execute: acquiring a ground-view image, an aerial-view image, a ground depth image, and an aerial depth image, the ground depth image being an image that indicates distance from a ground camera to each location captured in the ground-view image, the aerial depth image being an image that indicates distance from a center location captured in the aerial-view image to each location captured in the aerial-view image, extracting features from the ground-view image and the ground depth image to compute ground feature: extracting features from the aerial-view image and the aerial depth image to compute aerial feature; and determining whether or not the ground-view image and the aerial-view image match each other using the ground feature and the aerial feature.

Advantageous Effects of Invention

According to the present disclosure, it is possible to provide a novel technique to determine whether a ground-view image and an aerial-view image match each other.

DESCRIPTION OF EMBODIMENTS

Example embodiments according to the present disclosure will be described hereinafter with reference to the drawings. The same numeral signs are assigned to the same elements throughout the drawings, and redundant explanations are omitted as necessary. In addition, predetermined information (e.g., a predetermined value or a predetermined threshold) is stored in advance in a storage device to which a computer using that information has access unless otherwise described.

First Example Embodiment

Overview

Figure 1:
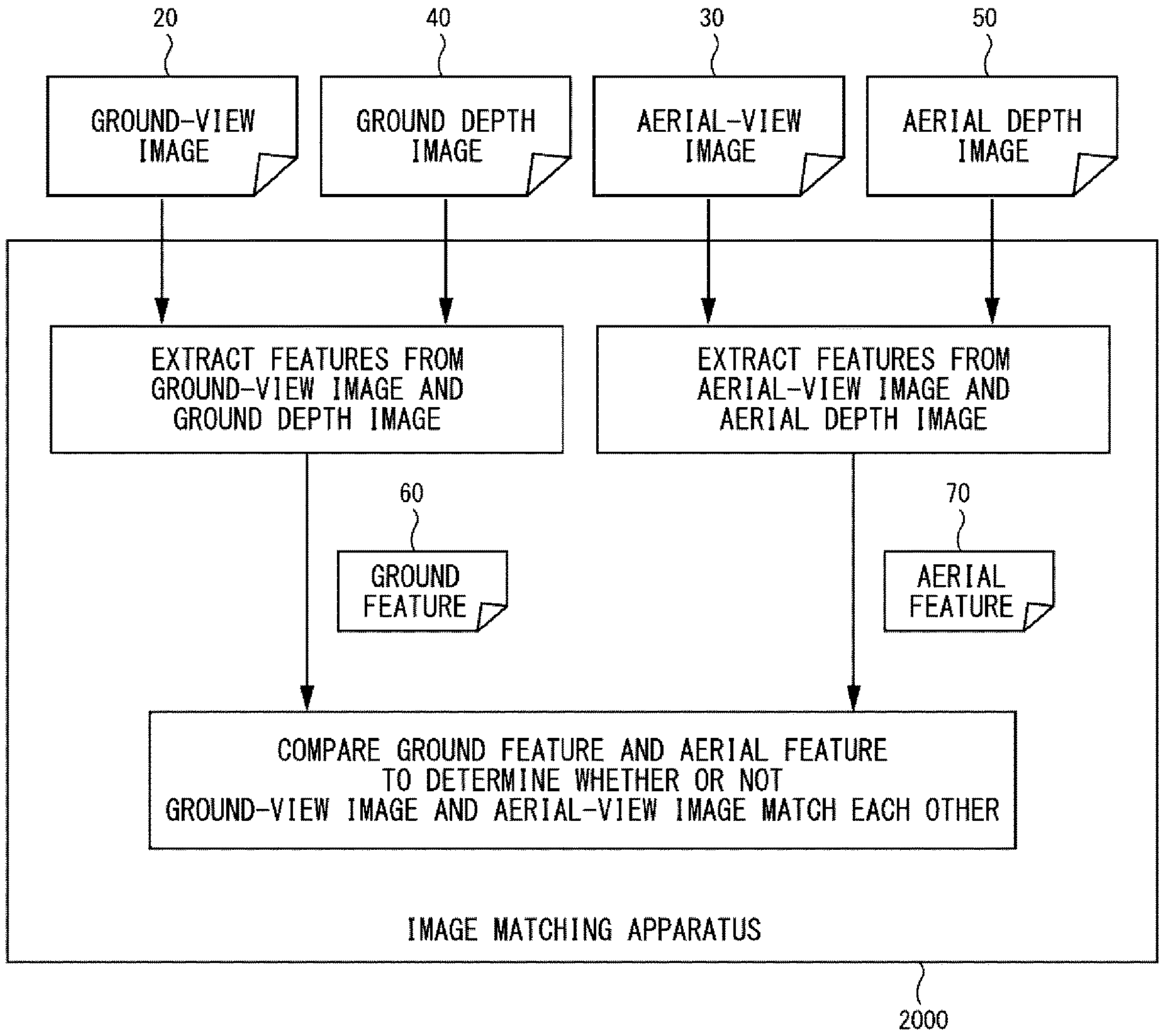
FIG. 1 illustrates an overview of an image matching apparatus 2000 of the first example embodiment.
Figure 2:
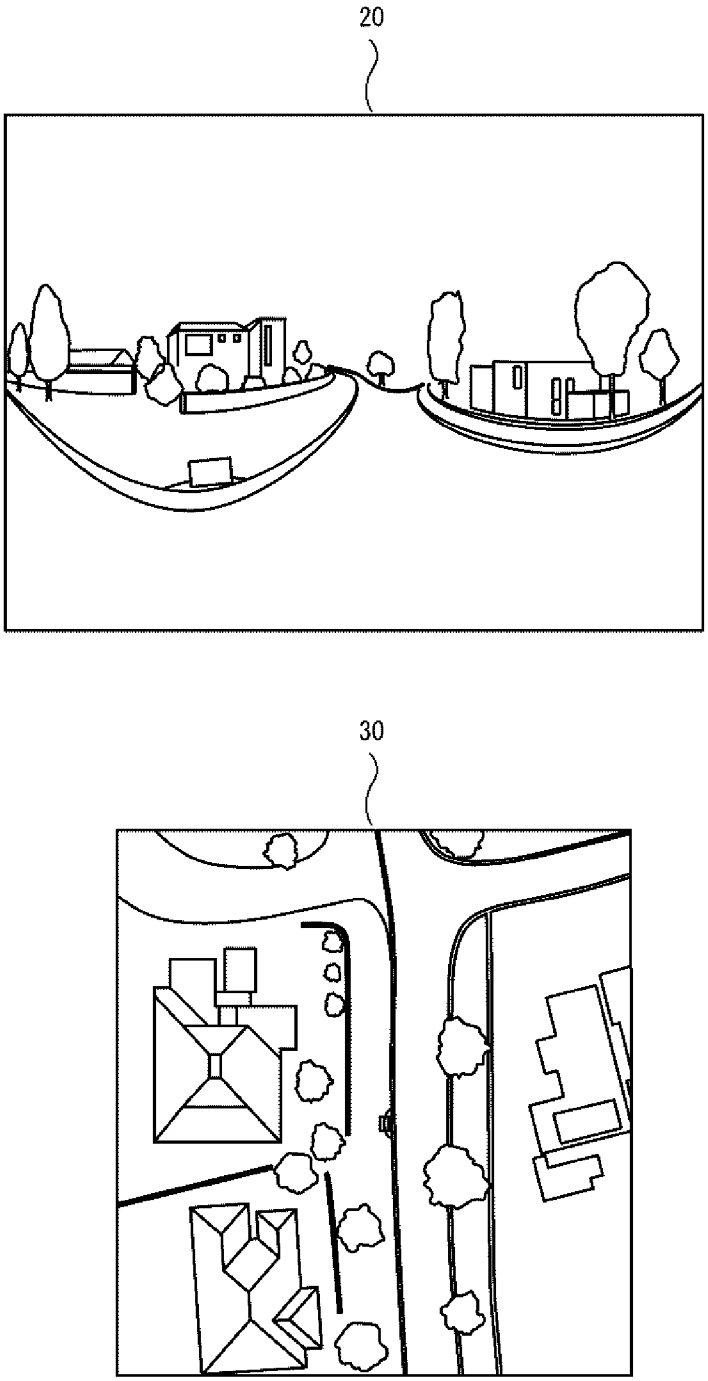
FIG. 2 illustrates an example of the ground-view image 20 and the aerial-view image 30.

FIG. 1 illustrates an overview of an image matching apparatus 2000 of the first example embodiment. The image matching apparatus 2000 functions as a discriminator that performs matching between a ground-view image 20 and an aerial-view image 30 (so-called ground-to-aerial cross-view matching). FIG. 2 illustrates an example of the ground-view image 20 and the aerial-view image 30.

The ground-view image 20 is a digital image that includes a ground view of a place, e.g., an RGB image of ground scenery. For example, the ground-view image 20 is generated by a ground camera that is held by a pedestrian or installed in a car. The ground-view image may be panoramic (having 360-degree field of view), or may have limited (less than 360-degree) field of view.

The aerial-view image 30 is a digital image that includes a top view of a place, e.g., an RGB image of aerial scenery. For example, the aerial-view image 30 is generated by an aerial camera installed in a drone, an air plane, or a satellite.

In addition to the ground-view image 20 and the aerial-view image 30, the image matching apparatus 2000 uses a depth image called "ground depth image 40" that corresponds to the ground-view image 20, and a depth image called "aerial depth image 50" that corresponds to the aerial-view image 30. The ground depth image 40 indicates approximate distance from the ground camera to each location captured in the ground-view image 20. On the other hand, the aerial depth image 50 indicates approximate distance from the center location captured in the aerial-view image 30 (not from the aerial camera) to each location captured in the aerial-view image 30. In the case where the ground-view image 20 and the aerial-view image 30 match each other, the center location captured in the aerial-view image 30 may be almost equivalent to the location at which the ground camera is located in top view. Thus, both the ground depth image 30 and the aerial depth image 40 may indicate approximate distance from the ground camera to each location captured in them.

It is noted that, as described in detail later, the ground depth image 40, the aerial depth image 50, or both may be generated in the image matching apparatus 2000 instead of being acquired from the outside of the image matching apparatus 2000.

The image matching apparatus 2000 extracts features from the above-mentioned images: the ground-view image 20, the aerial-view image 30, the ground depth image 40, and the aerial-depth image 50. Specifically, the image matching apparatus 2000 extracts features from the ground-view image 20 and the ground depth image 40 to obtain features called "ground feature 60" that represents combined features of the ground-view image 20 and the ground depth image 40. Similarly, the image matching apparatus 2000 extracts features from the aerial-view image 30 and the aerial depth image 50 to obtain features called "aerial feature 70" that represents combined features of the aerial-view image 30 and the aerial depth image 50.

After the extraction of the features, the image matching apparatus 2000 compares the ground feature 60 and the aerial feature 70 to determine whether the ground-view image 20 and the aerial-view image 30 match each other. In the case where the similarity between the ground feature 60 and the aerial feature 70 is substantially high, the image matching apparatus 2000 determines the ground-view image 20 and the aerial-view image 30 match each other. On the other hand, in the case where a similarity between the ground feature 60 and the aerial feature 70 is not substantially high, the image matching apparatus 2000 determines the ground-view image 20 and the aerial-view image 30 does not match each other.

Example of Advantageous Effect

According to the image matching apparatus 2000 of the 1st example embodiment, whether or not the ground-view image 20 and the aerial-view image 30 match each other is determined by comparing the combined features of the ground-view image 20 and the ground depth image 40 and the combined features of the aerial-view image 30 and the aerial depth image 50. By using the depth images, it is possible to compare objects captured in the ground-view image 20 and objects captured in the aerial-view image 30 based on not only their similarity in appearance but also their similarity in positions in space. Thus, comparing with the case where the depth images are not used, the image matching apparatus 2000 can perform the ground-to-aerial cross-view matching more accurately.

In particular, it is effective to take the similarity in positions in space into consideration in the case where some objects are visible in ground view but not visible in top view, or vice versa. Suppose that the ground camera and the aerial camera capture scenery of the place where a tall building is located extremely far from the ground camera. In this case, this building may be visible from the ground camera but not visible from the aerial camera since this building may be out of the coverage of the aerial camera. Thus, the ground-view image 20 may include this building whereas the aerial-view image 30 may not include it. When comparing those images only based on their visual similarity, it may be difficult to determine that those images match each other.

In another example, suppose that the ground camera and the aerial camera capture scenery of the place where there is a parking lot far from the ground camera and there are tall objects, such as trees or buildings, between the parking lot and the ground camera. In this case, this parking lot may be visible from the aerial camera but not from the ground camera since this parking lot may be hidden by the trees or buildings in the ground view. Thus, the aerial-view image 30 may include the parking lot whereas the ground-view image 20 may not include it. When comparing those images only based on their visual similarity, it may be difficult to determine that those images match each other.

Even in the above-mentioned cases, because the image matching apparatus 2000 compares the ground-view image 20 and the aerial-view image 30 taking their spatial similarity into account, it may successfully determine that those images match each other.

Hereinafter, more detailed explanation of the image matching apparatus 2000 will be described.

<Example of Functional Configuration>

Figure 3:
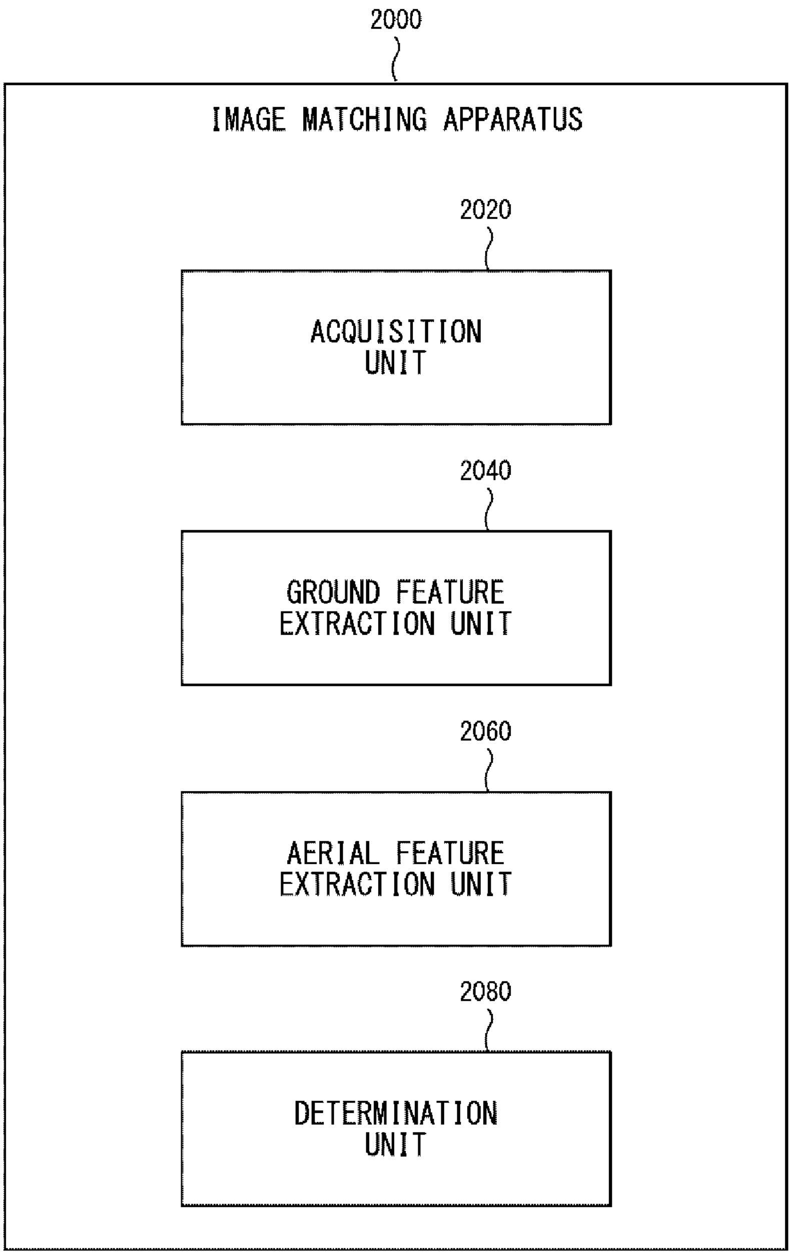
FIG. 3 is a block diagram illustrating an example of a functional configuration of the image matching apparatus.

FIG. 3 is a block diagram showing an example of the functional configuration of the image matching apparatus 2000. The image matching apparatus 2000 includes an acquisition unit 2020, a ground feature extraction unit 2040, an aerial feature extraction unit 2060, and a determination unit 2080.

The acquisition unit 2020 acquires the ground-view image 20, the aerial-view image 30, the ground depth image 40, and the aerial depth image 50. The ground feature extraction unit 2040 extracts features from the ground-view image 20 and the ground depth image 40 to compute the ground feature 60. The aerial feature extraction unit 2060 extracts features from the aerial-view image 30 and the aerial depth image 50 to compute the aerial feature 70. The determination unit 2080 determines whether the ground-view image 20 and the aerial-view image 30 match each other by comparing the ground feature 60 and the aerial feature 70.

<Example of Hardware Configuration>

The image matching apparatus 2000 may be realized by one or more computers. Each of the one or more computers may be a special-purpose computer manufactured for implementing the image matching apparatus 2000, or may be a general-purpose computer like a personal computer (PC), a server machine, or a mobile device.

The image matching apparatus 2000 may be realized by installing an application in the computer. The application is implemented with a program that causes the computer to function as the image matching apparatus 2000. In other words, the program is an implementation of the functional units of the image matching apparatus 2000.

Figure 4:
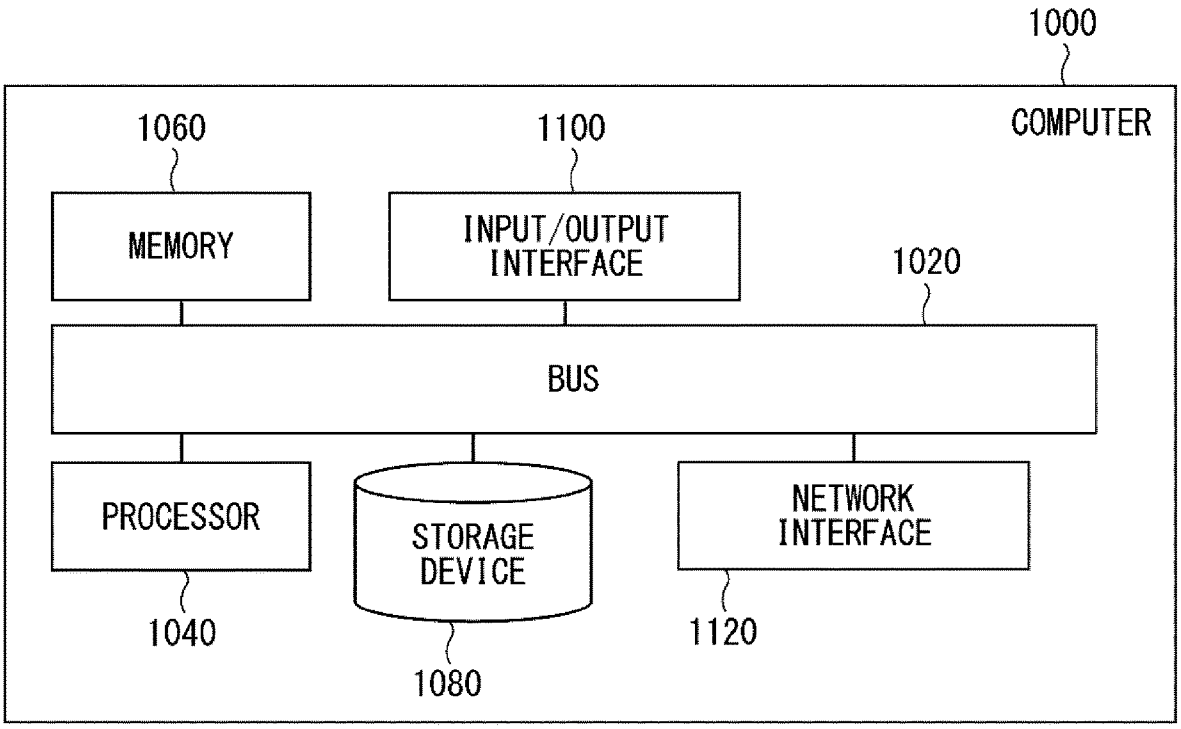
FIG. 4 is a block diagram illustrating an example of a hardware configuration of the image matching apparatus.

FIG. 4 is a block diagram illustrating an example of the hardware configuration of a computer 1000 realizing the image matching apparatus 2000. In FIG. 4, the computer 1000 includes a bus 1020, a processor 1040, a memory 1060, a storage device 1080, an input/output (I/O) interface 1100, and a network interface 1120.

The bus 1020 is a data transmission channel in order for the processor 1040, the memory 1060, the storage device 1080, and the I/O interface 1100, and the network interface 1120 to mutually transmit and receive data. The processor 1040 is a processer, such as a CPU (Central Processing Unit), GPU (Graphics Processing Unit), or FPGA (Field-Programmable Gate Array). The memory 1060 is a primary memory component, such as a RAM (Random Access Memory) or a ROM (Read Only Memory). The storage device 1080 is a secondary memory component, such as a hard disk, an SSD (Solid State Drive), or a memory card. The I/O interface 1100 is an interface between the computer 1000 and peripheral devices, such as a keyboard, mouse, or display device. The network interface 1120 is an interface between the computer 1000 and a network. The network may be a LAN (Local Area Network) or a WAN (Wide Area Network). The storage device 1080 may store the program mentioned above. The CPU 1040 executes the program to realize each functional unit of the image matching apparatus 2000.

The hardware configuration of the computer 1000 is not restricted to that shown in FIG. 4. For example, as mentioned-above, the image matching apparatus 2000 may be realized by plural computers. In this case, those computers may be connected with each other through the network.

<Flow of Process>

Figure 5:
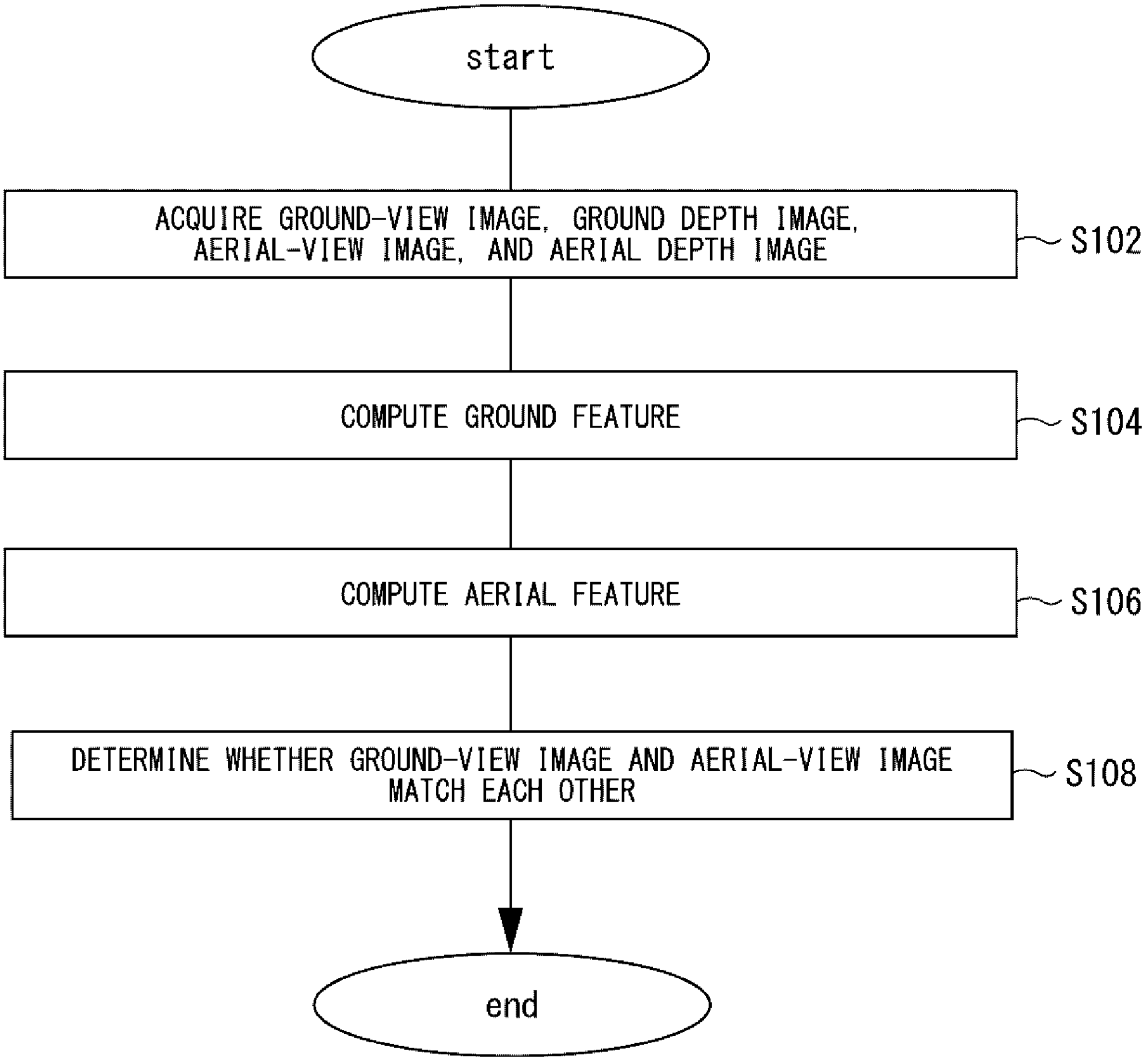
FIG. 5 shows a flowchart illustrating an example flow of processes performed by the image matching apparatus.

FIG. 5 shows a flowchart illustrating an example flow of processes performed by the image matching apparatus 2000.

The acquisition unit 2020 acquires the ground-view image 20, the aerial-view image 30, the ground depth image 40, and the aerial depth image 50 (S102). The ground feature extraction unit 2040 extracts features from the ground-view image 20 and the ground depth image 40 to compute the ground feature 60 (S104). The aerial feature extraction unit 2060 extracts features from the aerial-view image 30 and the aerial depth image 50 to compute the aerial feature 70 (S106). The determination unit 2080 determines whether the ground-view image 20 and the aerial-view image 40 match each other using the ground feature 60 and the aerial feature 70 (S108).

<Example Application of Image Matching Apparatus 2000>

There are various possible applications of the image matching apparatus 2000. For example, the image matching apparatus 2000 can be used as a part of a system (hereinafter, a geo-localization system) that performs image geo-localization. Image geo-localization is a technique to determine the place at which an input image is captured. The geo-localization system 200 may be implemented by one or more arbitrary computers such as ones depicted in FIG. 4. It is noted that the geo-localization system is merely an example of the application of the image matching apparatus 2000, and the application of the image matching apparatus 2000 is not restricted to being used in the geo-localization system.

Figure 6:
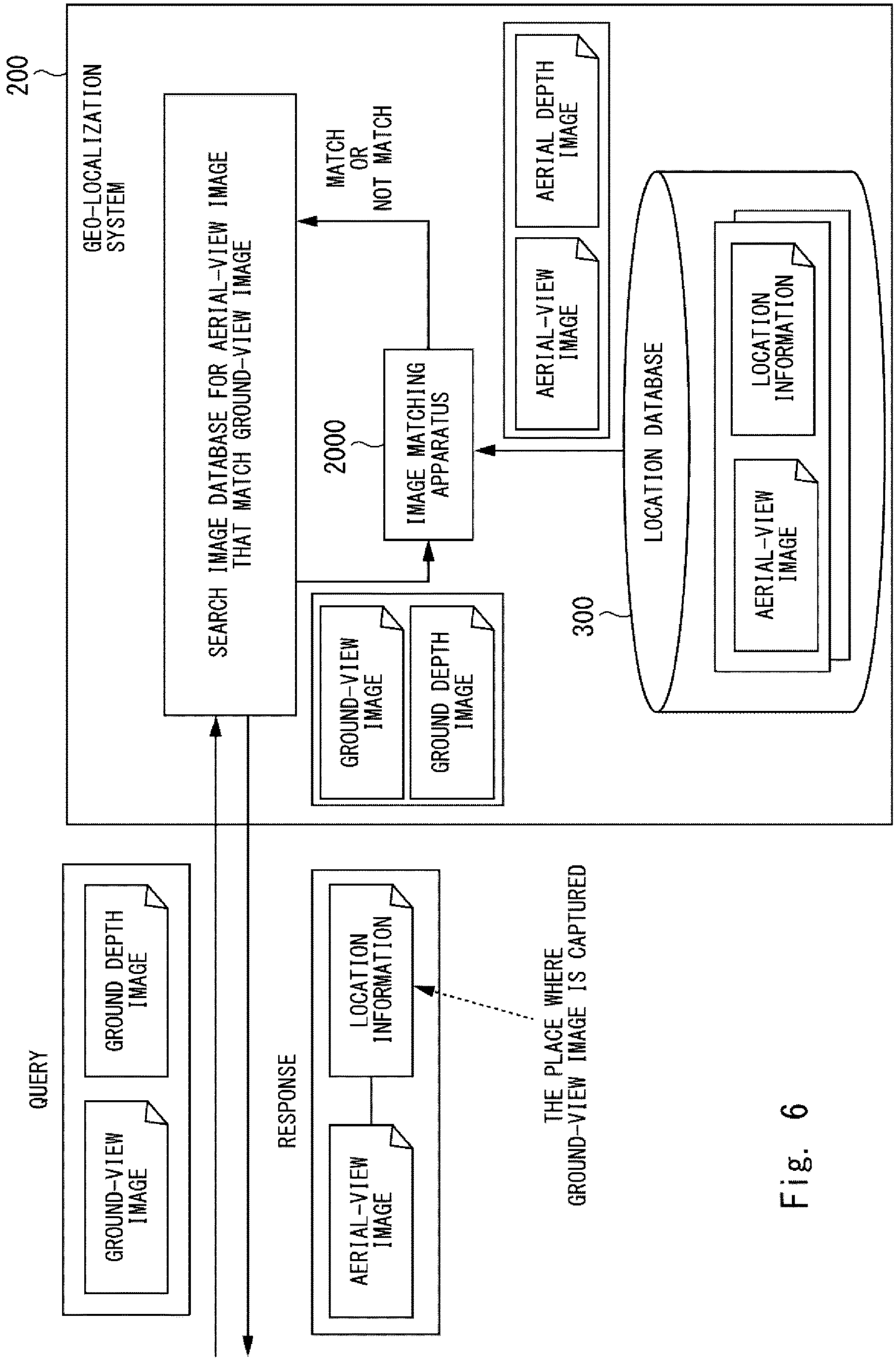
FIG. 6 illustrates a geo-localization system that includes the image matching apparatus.

FIG. 6 illustrates a geo-localization system 200 that includes the image matching apparatus 2000. The geo-localization system 200 includes the image matching apparatus 2000 and the location database 300. The location database 300 includes a plurality of aerial-view images to each of which location information is attached. An example of the location information may be GPS (Global Positioning System) coordinates of the place captured in the center of the corresponding aerial-view image.

The geo-localization system 200 receives a query that includes a set of a ground-view image and a ground depth image from a client (e.g., user terminal), and searches the location database 300 for the aerial-view image that matches the ground-view image in the received query, thereby determining the place at which the ground-view image is captured. Specifically, until the aerial-view image that matches the ground-view image in the query is detected, the geo-localization system 200 repeatedly executes to: acquire one of the aerial-view images from the location database 300: input the set of the ground-view image and the ground depth image and a set of the acquired aerial-view image and an aerial depth image into the image matching apparatus 2000; and determine whether or not the output of the image matching apparatus 2000 indicates that the ground-view image matches the aerial-view image. By doing so, the geo-localization system 200 can find the aerial-view image that includes the place at which the ground-view image is captured. Since the detected aerial-view image is associated with the location information such as the GPS coordinates, the geo-localization system 200 can recognize that where the ground-view image is captured is the place that is indicated by the location information associated with the aerial-view image that matches the ground-view image.

It is noted that, as explained in detail later, there are various ways to acquire the aerial depth image and the ground depth image. In some implementations, the aerial depth image may be generated in advance and stored in the location database 300 in association with the aerial-view image. In other implementations, the geo-localization system 200 may generate the aerial depth image based on the aerial-view image acquired from the location database 300. Similarly, the geo-localization system 200 may generate the ground depth image based on the ground-view image instead acquiring the ground depth image from the query.

It is noted that the ground-view image and the aerial-view image are used in an opposite way in the geo-localization system 200. In this case, the location database 300 stores a plurality of ground-view images to each of which location information is attached. The geo-localization system 200 receives a query including an aerial-view image, and searches the location database 300 for the ground-view image that matches the aerial-view image in the query, thereby determining the location of the place that is captured in the aerial-view image.

<As to Ground Depth Images>

The ground depth image 40 indicates approximate distance from the ground camera to each location captured in the ground-view image 20. For example, a pixel of the ground depth image 40 has a larger pixel value as the distance between the ground camera to the location corresponding to that pixel is smaller. It is preferable that the pixel values of the ground depth image 40 are normalized so that the range of pixels is set to be a predefined one, e.g., [0, 1].

There are various ways to generate the ground depth image 40. In some implementations, the ground depth image 40 may be generated using a distance sensor (e.g., a depth camera, LiDAR (light detection and ranging), and so on) that measures distance from it to each location in the sensing range of the distance sensor. In this case, it is preferable to place the ground camera and the distance sensor in close proximity so that a ground depth image generated by the distance sensor indicates approximate distance from the ground camera to each location. For example, the depth sensor may be integrated in the housing of the ground camera.

In other implementations, the ground depth image 40 is generated from the ground-view image 20. For example, a CNN-based technique, such as one disclosed by NPL2, that estimates depth from an RGB image can be used to generate the ground depth image 40 from the ground-view image 20. This generation of the ground depth image 40 from the ground-view image 20 may be performed by the image matching apparatus 2000 or another apparatus.

<As to Aerial Depth Image>

The aerial depth image 50 indicates approximate distance from the center location captured in the aerial-view image 30 to each location captured in the aerial-view image 30. The aerial depth image 50 may be generated by the image matching apparatus 2000 or another apparatus. In a similar manner to the ground depth image 40, a pixel of the aerial depth image 50 may have a larger pixel value as the distance between the center location captured in the aerial-view image 30 to the location corresponding to that pixel is smaller. It is preferable that the pixel values of the aerial depth image 50 are normalized so that the range of pixels is set to be a predefined one, e.g., [0,1].

Theoretically, the distance from a location L captured in the aerial-view image 30 to the center location C captured in the aerial-view image 30 becomes larger, as the distance from the pixel of the aerial-view image 30 corresponding to the location L to the center of the aerial-view image 30 corresponding to the location C becomes larger. Thus, a pixel value of each pixel of the aerial depth image 50 can be determined based on the distance between each pixel to the center of the image.

Based on this idea, the aerial depth image 50 may be generated so that each of the pixels of the aerial depth image 50 has a value that is proportional to the distance between that pixel and the center of the aerial depth image 50. Specifically, for example, the image matching apparatus 2000 may initialize the aerial depth image 50 with the same dimensions as those of the aerial-view image 50, and compute, for each pixel of the initialized aerial depth image 50, a value that is proportional to the distance between that pixel and the center of the aerial depth image 50 using a liner function. In order to obtain a larger value for a pixel as the distance between the pixel and the center of the aerial depth image 50 is smaller, the proportionality constant of the linear function is set to be a negative value. Then, the image matching apparatus 2000 normalizes the values obtained from the linear function, and uses the normalized values as the pixel values of the corresponding pixels.

It is noted that although the aerial depth image 50 is initialized to have the same dimensions as those of the aerial-view image 30, the aerial depth image 50 is not required to have the same dimensions as those of the aerial-view image 30. The same applies to the ground depth image 40, i.e., the dimensions of the ground depth image 40 is not required to be the same as those of the ground-view image 20.

Figure 7:
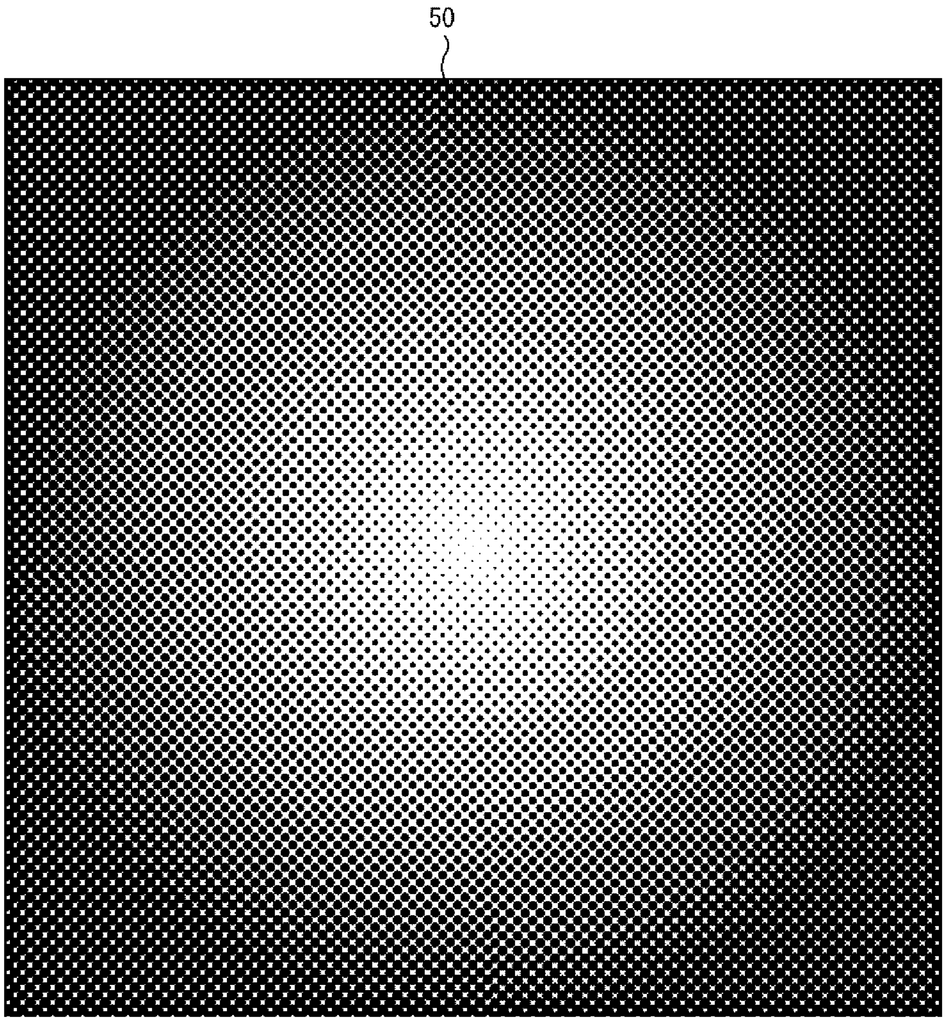
FIG. 7 illustrates the aerial depth image.

FIG. 7 illustrates the aerial depth image 50. In this figure, dots with lower density represent a region with pixels having larger pixel values. In addition, the pixel value of a pixel is set to be larger as the distance from the pixel to the center of the aerial depth image 50 is smaller. Thus, the density of dots in a region is depicted to be lower as the region is closer to the center of the aerial depth image 50.

<Acquisition of Images: S102>

The acquisition unit 2020 acquires the ground-view image 20, the aerial-view image 30, the ground depth image 40, and the aerial depth image 50 (S102). There are various ways to acquire those images. In some implementations, the acquisition unit 2020 may receive those images sent from another computer. In other implementations, the acquisition unit 2020 may retrieve those images from a storage device to which it has access.

Regarding the ground depth image 40 and the aerial depth image 50, the image matching apparatus 2000 may generate them based on the ground-view image 20 and the aerial-view image 30, and the acquisition unit 2020 obtains those depth images generated inside the image matching apparatus 2000. Concrete ways of generating the ground depth image 40 and the aerial depth image 50 have been mentioned above.

It is noted that since pixel values of the aerial depth image 50 do not depend on pixel values of the aerial-view image 30, the image matching apparatus 200 may use a common aerial depth image 50 for different aerial-view images 30. For example, the aerial depth image 50 is prepared in advance and stored in a storage device to which the image matching apparatus 2000 has access. The image matching apparatus 2000 may read the aerial depth image 50 from the storage device in response to the aerial-view image being received.

<Extraction of Ground Feature 60: S104>

The ground feature extraction unit 2040 computes the ground feature 60 based on the ground-view image 20 and the ground depth image 50 (S104). The ground feature 60 is a combination of features extracted from the ground-view image 20 and features extracted from the ground depth image 50. There exist various ways to extract features from images, and any one of them may be employed to form the ground feature extraction unit 2040. For example, the ground feature extraction unit 2040 may be realized by a machine learning-based model, such as a neural network. More specifically, a feature extraction layer of CNN (Convolutional Neural Network) may be employed to form the ground feature extraction unit 2040.

Figure 8:
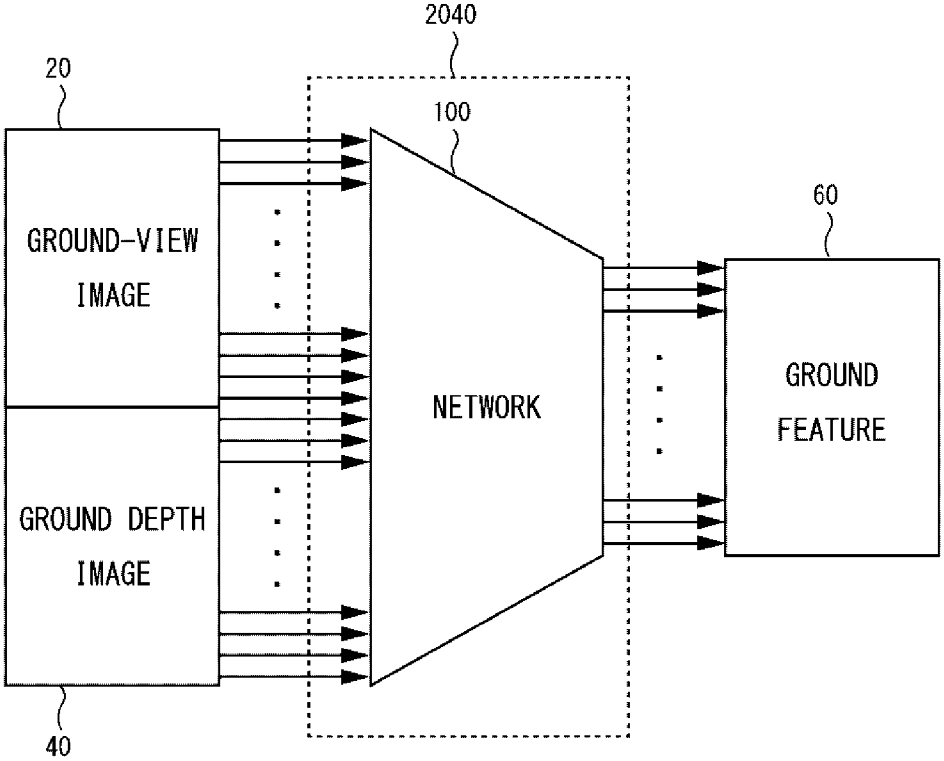
FIG. 8 illustrates example structures of the ground feature extraction unit.
Figure 8:
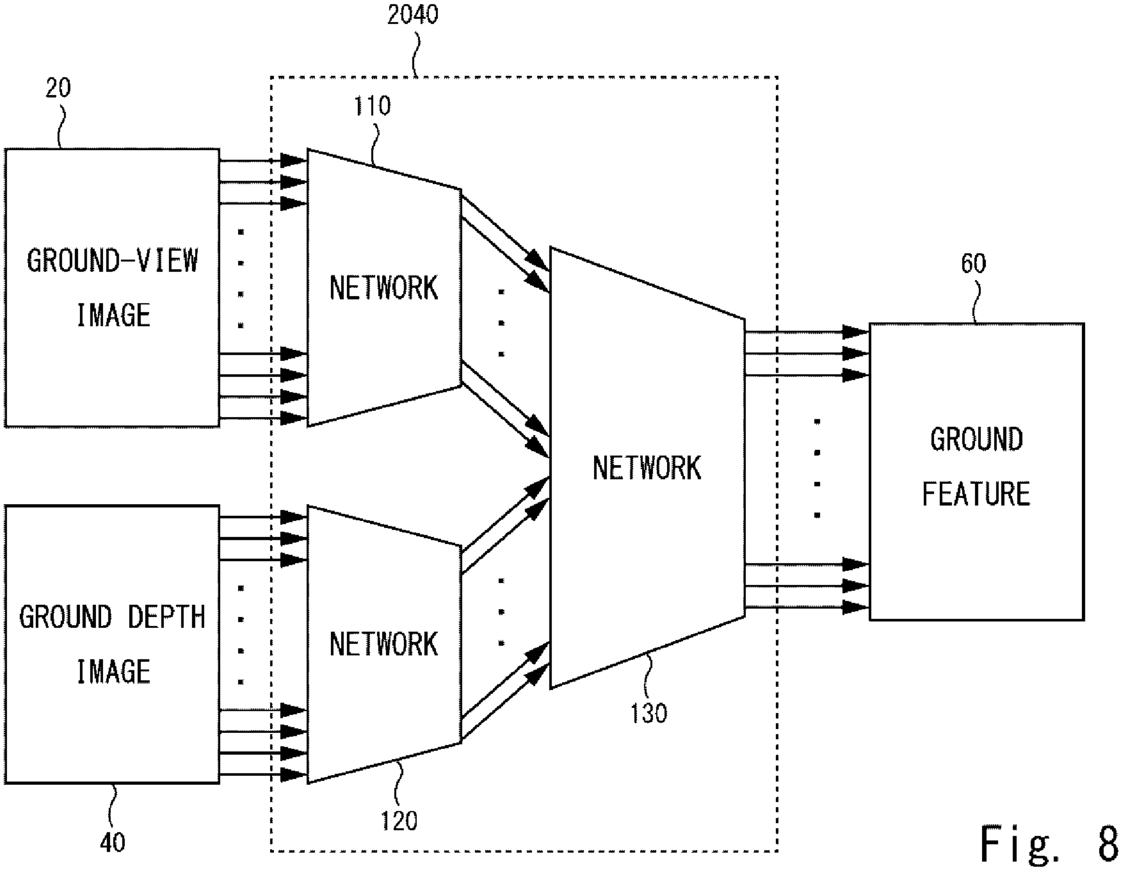

FIG. 8 illustrates example structures of the ground feature extraction unit 2040. In the case of the top picture, the ground feature extraction unit 2040 has a single network 100. The network 100 takes a concatenation of the ground-view image 20 and the ground depth image 50 as input, extracts features from this concatenated data, and outputs the extracted features as the ground feature 60.

On the other hand, in the case of the bottom picture, the ground feature extraction unit 2040 has three networks 110, 120, and 130. The network 110 takes the ground-view image 20 as input, extracts features therefrom, and outputs the extracted features. Similarly, the network 120 takes the ground depth image 50 as input, extracts features therefrom, and output the extracted features. The network 130 takes the features extracted from the ground-view image 20 and those extracted from the ground depth image 50 as input, combines them, and outputs the combined features as the ground feature 60.

<Extraction of Aerial Feature 70: S106>

The aerial feature extraction unit 2060 computes the aerial feature 70 based on the aerial-view image 30 and the aerial depth image 60 (S106). The aerial feature 70 is a combination of features extracted from the ground-view image 20 and features extracted from the ground depth image 50.

Figure 9:
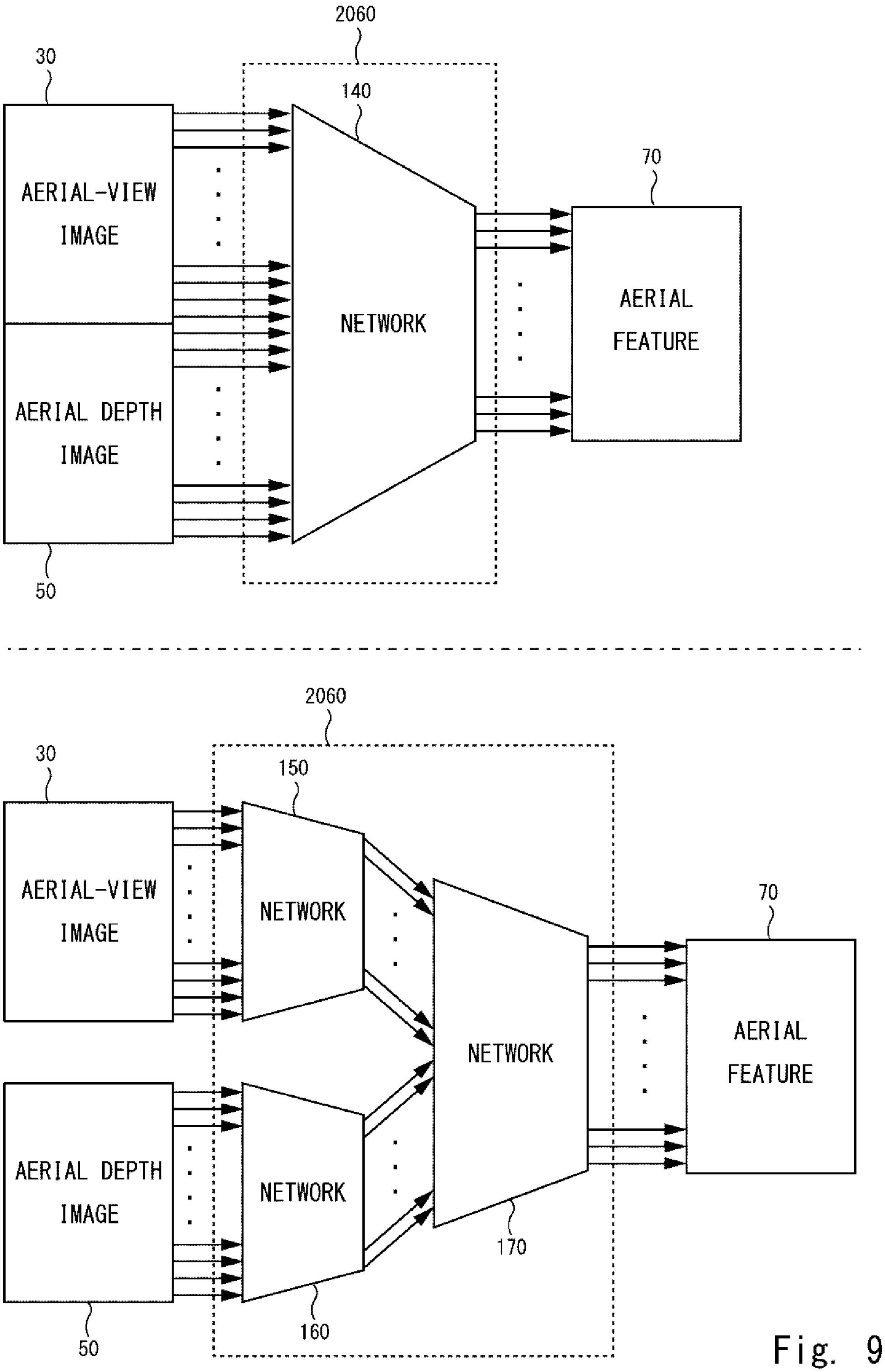
FIG. 9 illustrates example structures of the aerial feature extraction unit.

FIG. 9 illustrates example structures of the aerial feature extraction unit 2060. The aerial feature extraction unit 2060 can be formed in the same manner as the ground feature extraction unit 2080 except that it takes the aerial-view image 30 and the aerial depth image 60 instead of the ground-view image 20 and the ground depth image 50.

Specifically, in the top picture, the aerial feature extraction unit 2060 includes a network 140 that takes a concatenation of the aerial-view image 30 and the aerial depth image 50 as input, and outputs combined features of the aerial-view image 30 and the aerial depth image 50. In the bottom picture, the aerial feature extraction unit 2060 includes networks 150, 160, and 170: the network 150 takes the aerial-view image 30 as input and outputs features thereof: the network 160 takes the aerial depth image 50 as input and outputs features thereof; and the network 170 takes the features of the aerial-view image 30 and those of the aerial ground image 50 as input and outputs combined features thereof.

<Matching of Ground-View Image 20 and Aerial-View Image 30: S108>

The determination unit 2080 determines whether or not the ground-view image 20 and the aerial-view image 30 match each other by comparing the ground feature 60 and the aerial feature 70 (S108). In order for the comparison, the determination 2080 may compute a similarity score that indicates a degree of similarity between the ground-view image 20 and the aerial-view image 30.

Various metrics can be used to compute the similarity score. For example, the similarity score may be computed as one of various types of distance (e.g., L2 distance), correlation, cosine similarity, or NN (neural network) based similarity between the ground feature 60 and the aerial feature 70. The NN based similarity is the degree of similarity computed by a neural network that is trained to compute the degree of similarity between two input data (in this case, the ground feature 60 and the aerial feature 70).

The determination unit 2080 determines whether or not the ground-view image 20 and the aerial-view image 30 match each other based on the similarity score computed for them. Conceptually, the higher the degree of similarity between the ground-view image 20 and the aerial-view image 30 is, the higher the possibility of that the ground-view image 20 and the aerial-view image 30 match each other. Therefore, for example, the determination unit 2080 determines whether or not the similarity score is equal to or larger than a predefined threshold. If the similarity score is equal to or larger than the predefined threshold, the determination unit 2080 determines that the ground-view image 20 and the aerial-view image 30 match each other. On the other hand, if the similarity score is less than a predefined threshold, the determination unit 2080 determines that the ground-view image 20 and the aerial-view image 30 do not match each other.

It is noted that, in the case mentioned above, the similarity score is assumed to become larger as the degree of similarity between the ground feature 60 and the aerial feature 70 becomes higher. Thus, if a metric such as a distance with which a value computed for the ground feature 60 and the aerial feature 70 becomes less as the degree of similarity therebetween becomes higher is used, the similarity score may be defined as the reciprocal of the value computed for the ground feature 60 and the aerial feature 70.

In another example, in the case where the similarity score becomes less as the degree of similarity between the ground feature 60 and the aerial feature 70 becomes higher, the determination unit 2080 may determine whether the similarity score is equal to or less than a predefined threshold. If the similarity score is equal to or less than the predefined threshold, the determination unit 2080 determines that the ground-view image 20 and the aerial-view image 30 match each other. On the other hand, if the similarity score is larger than the predefined threshold, the determination unit 2080 determines that the ground-view image 20 and the aerial-view image 30 do not match each other.

<Output from Image Matching Apparatus 2000>

The image matching apparatus 2000 may output information (hereinafter, output information) indicating a result of the determination. For example, the output information may indicate whether or not the ground-view image 20 and the aerial-view image 30 match each other.

There are various ways to output the output information. For example, the image matching apparatus 2000 may put the output information into a storage device. In another example, the image matching apparatus 2000 may output the output information to a display device so that the display device displays the contents of the output information. In another example, the image matching apparatus 2000 may output the output information to another computer, such as one included in the geo-localization system 200 shown in FIG. 6.

<Training of Models>

The image matching apparatus 2000 may include one or more machine learning-based models, such as neural networks. For example, as described above, the ground feature extraction unit 2040 and the aerial feature extraction unit 2060 may include neural networks (e.g., feature extraction layers of CNN). When the image matching apparatus 2000 is implemented with the machine learning-based models, those models have to be trained in advance using training datasets.

In some implementations, a computer (hereinafter, training apparatus) that trains the models may repeatedly perform: computing a loss (e.g., a triplet loss) using a training dataset; and updates trainable parameters of the models based on the computed loss. It is noted that the training apparatus may be implemented in the computer 500 in which the image matching apparatus 2000 is implemented, or may be implemented in other computers. In the former case, it can be described that the image matching apparatus 2000 also have functions of the training apparatus explained later. In the latter case, the training apparatus may be implemented using one or more computers whose hardware configuration can be exemplified by FIG. 4, similar to the image matching apparatus 2000.

When using a triplet loss to train the models, the training dataset may include an anchor image, a positive example image, and a negative example image. The positive example image is an image of a type different from the anchor image, and matches the anchor image. The negative example image is an image of a type different from the anchor image but same as the positive example image, and does not match the anchor image. In the case where the training dataset includes a ground-view image as the anchor image, it includes an aerial-view image that matches the anchor image as the positive example image and another aerial-view image that does not match the anchor image as the negative example image. On the other hand, in the case where the training dataset includes an aerial-view image as the anchor image, it includes a ground-view image that matches the anchor image as the positive example image and another ground-view image that does not match the anchor image as the negative example image.

The training dataset may also include a ground depth image and an aerial depth image. In the case where the positive example image and the negative example image are ground-view images, the training dataset may include a ground depth image that corresponds to the positive example image and another ground depth image that corresponds to the negative example image. However, as mentioned above, the ground depth image, the aerial depth image, or both can be generated instead of acquiring from the outside.

The training apparatus uses the ground feature extraction unit 2040 and the aerial feature extraction unit 2060 to obtain features from each image in the training dataset. Suppose that the training dataset includes a ground-view image as the anchor image. In this case, the training apparatus inputs the anchor image and the ground depth image into the ground feature extraction unit 2040 to obtain the ground feature of the anchor image. In addition, the training apparatus inputs the positive example image and the aerial depth image into the aerial feature extraction unit 2060 to obtain the aerial feature of the positive example image. Similarly, the training apparatus inputs the negative example image and the aerial depth image into the aerial feature extraction unit 2060 to obtain the aerial feature of the negative example image.

After obtaining the features, the training apparatus computes a triplet loss based on the ground feature, the aerial feature of the positive example image, and the aerial feature of the negative example image. Then, the training apparatus updates trainable parameters of the models based on the obtained triplet loss. It is noted that there are various wall-known ways to update trainable parameters of one or more machine learning-based models based on a triplet loss computed based on the outputs from those models, and any one of them can be employed in the training apparatus.

In the case where the training dataset includes an aerial-view image as the anchor image, the training apparatus obtains the aerial feature of the anchor image by inputting the anchor image and the aerial depth image into the aerial feature extraction unit 2060. In addition, the training apparatus obtains the ground feature of the positive example image by inputting the positive example image and the ground depth image corresponding to the positive example image into the ground feature extraction unit 2040. Similarly, the training apparatus obtains the ground feature of the negative example image by inputting the negative example image and the ground depth image corresponding to the negative example image into the ground feature extraction unit 2040. Then, the training apparatus computes the triplet loss based on the aerial feature of the anchor image, the ground feature of the positive example image, and the ground feature of the negative example image, and updates the trainable parameters of the models based on the computed loss.

It is also noted that a triplet loss is a merely example of a loss capable of being used to train the models, and any other types of loss may be used to train the models.

<Modification of Training Dataset>

The training apparatus may modify training datasets so as to make them more preferable for the training of the models in the image matching apparatus 2000. It is noted that not only the modified training datasets but also the original training datasets may also be used to train the models. In this case, the number of training datasets is increased by modifying the original training datasets. In other words, data augmentation is performed by modifying the original training datasets.

In some implementations, the training apparatus modifies pixels of the ground-view image that represent locations distant from the ground camera. Specifically, the training apparatus determines pixels of the ground depth image whose pixel values are less than a predetermine threshold, i.e., pixels that correspond to locations whose distance from the ground camera is larger than a predetermined distance. Then, the training apparatus modifies pixel values of the pixels of the ground-view image that correspond to the determined pixels of the ground depth image.

The pixel values of the ground-view image are modified so that objects represented by those pixels become unclear comparing to objects represented by the original ones. Example ways to do so are blurring, adding noise, or blacking out (i.e., changing the pixel values to 0).

From the viewpoint of the ground-to-aerial cross-view matching, the closer objects captured in the ground-view image are to the ground camera, the more effective features of those objects are for the matching. Thus, it is preferable for the feature extractor to extract features in such a way that features of the objects relatively close to the ground camera are dominant than those of the objects relatively distant from the ground camera.

By modifying the ground-view image so that the objects relatively distant from the ground camera become unclear, features extracted from pixels that represent objects relatively close to the ground camera become dominant in the ground feature extracted by the ground feature extraction unit 2040. Thus, the ground feature extraction unit 2040 can be trained to extract the features of the ground-view image that are more effective for the ground-to-aerial cross-view matching.

In a similar manner, the training apparatus may modify pixels of the aerial-view image that represent objects distant from the center location captured in the aerial-view image. Specifically, the training apparatus determines pixels of the aerial-view image whose distance from the center of the aerial-view image is larger than a predetermine threshold. Then, the training apparatus modifies pixel values of the determined pixels of the aerial-view image. Like the modification of the ground-view image, example ways of modifying the aerial-view image may be blurring, adding noise, or blacking out. By modifying the aerial-view image in the manner mentioned above, the aerial feature extraction unit 2060 can be trained to extract the features of the aerial-view image that are more effective for the ground-to-aerial cross-view matching.

It is noted that the training apparatus may modify the ground-view image, the aerial-view image, or both in the training dataset.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

The whole or part of the example embodiments disclosed above can be described as, but not limited to, the following supplementary notes.

Supplementary Notes (Supplementary Note 1)

An image matching apparatus comprising:

at least one memory that is configured to store instructions; and at least one processor that is configured to execute the instructions to:

acquire a ground-view image, an aerial-view image, a ground depth image, and an aerial depth image, the ground depth image being an image that indicates distance from a ground camera to each location captured in the ground-view image, the aerial depth image being an image that indicates distance from a center location captured in the aerial-view image to each location captured in the aerial-view image, extract features from the ground-view image and the ground depth image to compute ground feature;

extract features from the aerial-view image and the aerial depth image to compute aerial feature; and determine whether or not the ground-view image and the aerial-view image match each other based on the ground feature and the aerial feature.

(Supplementary Note 2)

The image matching apparatus according to supplementary note 1, wherein the acquisition of the aerial depth image includes:

generating the aerial depth image by computing distance between each pixel of the aerial image and a center of the aerial image and setting, to each pixel of the aerial depth image, a value proportional to the computed distance between that pixel and the center of the aerial depth image; and acquiring the generated aerial depth image.

(Supplementary Note 3)

The image matching apparatus according to supplementary note 1 or 2, wherein the determination of whether or not the ground-view image and the aerial-view image match each other includes:

computing similarity between the ground feature and the aerial feature; and determining that the ground-view image and the aerial-view image match each other when the computed similarity is larger than or equal to a predetermined threshold.

(Supplementary Note 4)

The image matching apparatus according to any one of supplementary notes 1 to 3, wherein the at least one memory is configured to further store a first model and a second model, the first model being trained to extract features from the ground-view image and the ground depth image to output the ground feature, the second model being trained to extract features from the aerial-view image and the aerial depth image to output the aerial feature, and the at least one processor is further configured to execute the instructions to:

acquiring a training dataset that includes the ground-view image, the ground depth image, a positive example of the aerial-view image, a negative example of the aerial-view image, and the aerial depth image;

inputting the ground-view image and the ground depth image into the first model to obtain the ground feature;

inputting the positive example and the aerial depth image into the second model to obtain an aerial feature of the positive example;

inputting the negative example and the aerial depth image into the second model to obtain an aerial feature of the negative example; and updating trainable parameters of the first model and the second model based on the ground feature, the aerial feature of the positive example, and the aerial feature of the negative example.

(Supplementary Note 5)

The image matching apparatus according to any one of supplementary notes 1 to 3, wherein the at least one memory is configured to further store a first model and a second model, the first model being trained to extract features from the ground-view image and the ground depth image to output the ground feature, the second model being trained to extract features from the aerial-view image and the aerial depth image to output the aerial feature, and the at least one processor is further configured to execute the instructions to:

acquiring a training dataset that includes the aerial-view image, a positive example of the ground-view image, a negative example of the aerial-view image, the aerial depth image, a ground depth image corresponding to the positive example, and a ground depth image corresponding to the negative example;

inputting the aerial-view image and the aerial depth image into the second model to obtain the aerial feature;

inputting the positive example and the ground depth image corresponding to the positive example into the first model to obtain a ground feature of the positive example;

inputting the negative example and the ground depth image corresponding to the negative example into the first model to obtain a ground feature of the negative example; and updating trainable parameters of the first model and the second model based on the aerial feature, the ground feature of the positive example, and the ground feature of the negative example.

(Supplementary Note 6)

The image matching apparatus according to supplementary note 4 or 5, wherein the at least one processor is further configured to execute the instructions to modify the ground-view image in the training dataset by determining pixels of the ground depth image in the training dataset that indicate distance larger than a predetermined threshold, and modifying pixels of the ground-view image corresponding to the determined pixels of the ground depth image.

(Supplementary Note 7)

The image matching apparatus according to supplementary note 4 or 5, wherein the at least one processor is further configured to execute the instructions to modify the aerial-view image in the training dataset by modifying pixels of the aerial-view image whose distance from a center of that aerial-view image is larger than a predetermined threshold.

(Supplementary Note 8)

A control method performed by a computer, comprising:

acquiring a ground-view image, an aerial-view image, a ground depth image, and an aerial depth image, the ground depth image being an image that indicates distance from a ground camera to each location captured in the ground-view image, the aerial depth image being an image that indicates distance from a center location captured in the aerial-view image to each location captured in the aerial-view image, extracting features from the ground-view image and the ground depth image to compute ground feature;

extracting features from the aerial-view image and the aerial depth image to compute aerial feature; and determining whether or not the ground-view image and the aerial-view image match each other using the ground feature and the aerial feature.

(Supplementary Note 9)

The control method according to supplementary note 8, wherein the acquisition of the aerial depth image includes:

generating the aerial depth image by computing distance between each pixel of the aerial image and a center of the aerial image and setting, to each pixel of the aerial depth image, a value proportional to the computed distance between that pixel and the center of the aerial depth image; and acquiring the generated aerial depth image.

(Supplementary Note 10)

The control method according to supplementary note 8 or 9, wherein the determination of whether or not the ground-view image and the aerial-view image match each other includes:

computing similarity between the ground feature and the aerial feature; and determining that the ground-view image and the aerial-view image match each other when the computed similarity is larger than or equal to a predetermined threshold.

(Supplementary Note 11)

The control method according to any one of supplementary notes 9 to 10, wherein the computer is configured to store a first model and a second model, the first model being trained to extract features from the ground-view image and the ground depth image to output the ground feature, the second model being trained to extract features from the aerial-view image and the aerial depth image to output the aerial feature, and the control method further comprises:

acquiring a training dataset that includes the ground-view image, the ground depth image, a positive example of an aerial-view image, a negative example of an aerial-view image, and the aerial depth image;

inputting the ground-view image and the ground depth image to the first model to obtain the ground feature;

inputting the positive example of the aerial-view image and the aerial depth image to the second model to obtain an aerial feature of the positive example;

inputting the negative example of the aerial-view image and the aerial depth image to the second model to obtain an aerial feature of the negative example; and updating trainable parameters of the first model and the second model based on the ground feature, the aerial feature of the positive example, and the aerial feature of the negative example.

(Supplementary Note 12)

The control method according to any one of supplementary notes 9 to 10, wherein the computer is configured to store a first model and a second model, the first model being trained to extract features from the ground-view image and the ground depth image to output the ground feature, the second model being trained to extract features from the aerial-view image and the aerial depth image to output the aerial feature, and the control method further comprises:

acquiring a training dataset that includes the aerial-view image, a positive example of the ground-view image, a negative example of the aerial-view image, the aerial depth image, a ground depth image corresponding to the positive example, and a ground depth image corresponding to the negative example;

inputting the aerial-view image and the aerial depth image into the second model to obtain the aerial feature;

inputting the positive example and the ground depth image corresponding to the positive example into the first model to obtain a ground feature of the positive example;

inputting the negative example and the ground depth image corresponding to the negative example into the first model to obtain a ground feature of the negative example; and updating trainable parameters of the first model and the second model based on the aerial feature, the ground feature of the positive example, and the ground feature of the negative example.

(Supplementary Note 13)

The control method according to supplementary note 11 or 12, further comprising:

modifying the ground-view image in the training dataset by determining pixels of the ground depth image in the training dataset that indicate distance larger than a predetermined threshold, and modifying pixels of the ground-view image corresponding to the determined pixels of the ground depth image.

(Supplementary Note 14)

The control method according to supplementary note 11 or 12, further comprising:

modifying the aerial-view image in the training dataset by modifying pixels of the aerial-view image whose distance from a center of that aerial-view image is larger than a predetermined threshold.

(Supplementary Note 15)

A non-transitory computer-readable storage medium storing a program that causes a computer to execute:

acquiring a ground-view image, an aerial-view image, a ground depth image, and an aerial depth image, the ground depth image being an image that indicates distance from a ground camera to each location captured in the ground-view image, the aerial depth image being an image that indicates distance from a center location captured in the aerial-view image to each location captured in the aerial-view image, extracting features from the ground-view image and the ground depth image to compute ground feature;

extracting features from the aerial-view image and the aerial depth image to compute aerial feature; and determining whether or not the ground-view image and the aerial-view image match each other using the ground feature and the aerial feature.

(Supplementary Note 16)

The storage medium according to supplementary note 15, wherein the acquisition of the aerial depth image includes:

generating the aerial depth image by computing distance between each pixel of the aerial image and a center of the aerial image and setting, to each pixel of the aerial depth image, a value proportional to the computed distance between that pixel and the center of the aerial depth image; and acquiring the generated aerial depth image.

(Supplementary Note 17)

The storage medium according to supplementary note 15 or 16, wherein the determination of whether or not the ground-view image and the aerial-view image match each other includes:

computing similarity between the ground feature and the aerial feature; and determining that the ground-view image and the aerial-view image match each other when the computed similarity is larger than or equal to a predetermined threshold.

(Supplementary Note 18)

The storage medium according to any one of supplementary notes 15 to 17, further storing a first model and a second model, the first model being trained to extract features from the ground-view image and the ground depth image to output the ground feature, the second model being trained to extract features from the aerial-view image and the aerial depth image to output the aerial feature, wherein the program further causes the computer to execute:

acquiring a training dataset that includes the ground-view image, the ground depth image, a positive example of an aerial-view image, a negative example of an aerial-view image, and the aerial depth image;

inputting the ground-view image and the ground depth image to the first model to obtain the ground feature;

inputting the positive example of the aerial-view image and the aerial depth image to the second model to obtain an aerial feature of the positive example;

inputting the negative example of the aerial-view image and the aerial depth image to the second model to obtain an aerial feature of the negative example; and updating trainable parameters of the first model and the second model based on the ground feature, the aerial feature of the positive example, and the aerial feature of the negative example.

(Supplementary Note 19)

The storage medium according to any one of supplementary notes 15 to 17, further storing a first model and a second model, the first model being trained to extract features from the ground-view image and the ground depth image to output the ground feature, the second model being trained to extract features from the aerial-view image and the aerial depth image to output the aerial feature, wherein the program further causes the computer to execute:

acquiring a training dataset that includes the aerial-view image, a positive example of the ground-view image, a negative example of the aerial-view image, the aerial depth image, a ground depth image corresponding to the positive example, and a ground depth image corresponding to the negative example;

inputting the aerial-view image and the aerial depth image into the second model to obtain the aerial feature;

inputting the positive example and the ground depth image corresponding to the positive example into the first model to obtain a ground feature of the positive example;

inputting the negative example and the ground depth image corresponding to the negative example into the first model to obtain a ground feature of the negative example; and updating trainable parameters of the first model and the second model based on the aerial feature, the ground feature of the positive example, and the ground feature of the negative example.

(Supplementary Note 20)

The storage medium according to supplementary note 18 or 19, wherein the program further causes the computer to execute:

modifying the ground-view image in the training dataset by determining pixels of the ground depth image in the training dataset that indicate distance larger than a predetermined threshold, and modifying pixels of the ground-view image corresponding to the determined pixels of the ground depth image.

(Supplementary Note 21)

The storage medium according to supplementary note 18 or 19, wherein the program further causes the computer to execute:

modifying the aerial-view image in the training dataset by modifying pixels of the aerial-view image whose distance from a center of that aerial-view image is larger than a predetermined threshold.

REFERENCE SIGNS LIST

20 ground-view image
30 aerial-view image
40 ground depth image
50 aerial depth image
60 ground feature
70 aerial feature
100, 110, 120, 130, 140, 150, 160, 170 network
200 geo-localization system
300 location database
1000 computer
1020 bus
1040 processor
1060 memory
1080 storage device
1100 input/output interface
1120 network interface
2000 image matching apparatus
2020 acquisition unit
2040 ground feature extraction unit
2060 aerial feature extraction unit
2080 determination unit

What is claimed is:

1. An image matching apparatus comprising:
at least one memory configured to store instructions; and
at least one processor configured to execute the instructions to:
acquire a ground-view image, an aerial-view image, a ground depth image, and an aerial depth image, the ground depth image being an image that indicates a distance from a ground camera to each location captured in the ground-view image, and the aerial depth image being an image that indicates a distance from a center location captured in the aerial-view image to each location captured in the aerial-view image,
extract features from the ground-view image and the ground depth image to compute a ground feature;
extract features from the aerial-view image and the aerial depth image to compute an aerial feature; and
determine whether or not the ground-view image and the aerial-view image match each other based on the ground feature and the aerial feature,
wherein the acquisition of the aerial depth image comprises:
generating the aerial depth image by computing a distance between each pixel of the aerial image and a center of the aerial image and setting, to each pixel of the aerial depth image, a value proportional to the computed distance between that pixel and the center of the aerial depth image; and
acquiring the generated aerial depth image.

2. The image matching apparatus according to claim 1, wherein the determination of whether or not the ground-view image and the aerial-view image match each other comprises:
computing a similarity between the ground feature and the aerial feature; and
determining that the ground-view image and the aerial-view image match each other when the computed similarity is greater than or equal to a predetermined threshold.

3. The image matching apparatus according to claim 1, wherein the at least one memory is configured to further store a first model and a second model, the first model being trained to extract features from the ground-view image and the ground depth image to output the ground feature, the second model being trained to extract features from the aerial-view image and the aerial depth image to output the aerial feature, and
the at least one processor is further configured to execute the instructions to:
acquire a training dataset that comprises the ground-view image, the ground depth image, a positive example of the aerial-view image, a negative example of the aerial-view image, and the aerial depth image;
input the ground-view image and the ground depth image into the first model to obtain the ground feature;
input the positive example and the aerial depth image into the second model to obtain an aerial feature of the positive example;
input the negative example and the aerial depth image into the second model to obtain an aerial feature of the negative example; and
update trainable parameters of the first model and the second model based on the ground feature, the aerial feature of the positive example, and the aerial feature of the negative example.

4. The image matching apparatus according to claim 3, wherein the at least one processor is further configured to execute the instructions to modify the ground-view image in the training dataset by determining pixels of the ground depth image in the training dataset that indicate a distance greater than a predetermined threshold, and modifying pixels of the ground-view image corresponding to the determined pixels of the ground depth image.

5. The image matching apparatus according to claim 3, wherein the at least one processor is further configured to execute the instructions to modify the aerial-view image in the training dataset by modifying pixels of the aerial-view image whose distance from a center of that aerial-view image is greater than a predetermined threshold.

6. The image matching apparatus according to claim 1, wherein the at least one memory is configured to further store a first model and a second model, the first model being trained to extract features from the ground-view image and the ground depth image to output the ground feature, the second model being trained to extract features from the aerial-view image and the aerial depth image to output the aerial feature, and
the at least one processor is further configured to execute the instructions to:
acquire a training dataset that comprises the aerial-view image, a positive example of the ground-view image, a negative example of the ground-view image, the aerial depth image, a ground depth image corresponding to the positive example, and a ground depth image corresponding to the negative example;
input the aerial-view image and the aerial depth image into the second model to obtain the aerial feature;
input the positive example and the ground depth image corresponding to the positive example into the first model to obtain a ground feature of the positive example;
input the negative example and the ground depth image corresponding to the negative example into the first model to obtain a ground feature of the negative example; and
update trainable parameters of the first model and the second model based on the aerial feature, the ground feature of the positive example, and the ground feature of the negative example.

7. A control method performed by a computer, comprising:

acquiring a ground-view image, an aerial-view image, a ground depth image, and an aerial depth image, the ground depth image being an image that indicates a distance from a ground camera to each location captured in the ground-view image, and the aerial depth image being an image that indicates a distance from a center location captured in the aerial-view image to each location captured in the aerial-view image, extracting features from the ground-view image and the ground depth image to compute a ground feature;

extracting features from the aerial-view image and the aerial depth image to compute an aerial feature; and determining whether or not the ground-view image and the aerial-view image match each other using the ground feature and the aerial feature, wherein the acquisition of the aerial depth image comprises:

generating the aerial depth image by computing a distance between each pixel of the aerial image and a center of the aerial image and setting, to each pixel of the aerial depth image, a value proportional to the computed distance between that pixel and the center of the aerial depth image; and acquiring the generated aerial depth image.

8. The control method according to claim 7, wherein the computer is configured to store a first model and a second model, the first model being trained to extract features from the ground-view image and the ground depth image to output the ground feature, the second model being trained to extract features from the aerial-view image and the aerial depth image to output the aerial feature, and the control method further comprises: acquiring a training dataset that includes the ground-view image, the ground depth image, a positive example of an aerial-view image, a negative example of an aerial-view image, and the aerial depth image; inputting the ground-view image and the ground depth image to the first model to obtain the ground feature; inputting the positive example of the aerial-view image and the aerial depth image to the second model to obtain an aerial feature of the positive example; inputting the negative example of the aerial-view image and the aerial depth image to the second model to obtain an aerial feature of the negative example; and updating trainable parameters of the first model and the second model based on the ground feature, the aerial feature of the positive example, and the aerial feature of the negative example.

9. The control method according to claim 8, further comprising: modifying the ground-view image in the training dataset by determining pixels of the ground depth image in the training dataset that indicate distance larger than a predetermined threshold, and modifying pixels of the ground-view image corresponding to the determined pixels of the ground depth image.

10. The control method according to claim 8, further comprising: modifying the aerial-view image in the training dataset by modifying pixels of the aerial-view image whose distance from a center of that aerial-view image is larger than a predetermined threshold.

11. The control method according to claim 7, wherein the computer is configured to store a first model and a second model, the first model being trained to extract features from the ground-view image and the ground depth image to output the ground feature, the second model being trained to extract features from the aerial-view image and the aerial depth image to output the aerial feature, and the control method further comprises: acquiring a training dataset that includes the aerial-view image, a positive example of the ground-view image, a negative example of the aerial-view image, the aerial depth image, a ground depth image corresponding to the positive example, and a ground depth image corresponding to the negative example; inputting the aerial-view image and the aerial depth image into the second model to obtain the aerial feature; inputting the positive example and the ground depth image corresponding to the positive example into the first model to obtain a ground feature of the positive example; inputting the negative example and the ground depth image corresponding to the negative example into the first model to obtain a ground feature of the negative example; and updating trainable parameters of the first model and the second model based on the aerial feature, the ground feature of the positive example, and the ground feature of the negative example.

12. The control method according to claim 7, wherein the determination of whether or not the ground-view image and the aerial-view image match each other comprises:

computing a similarity between the ground feature and the aerial feature; and determining that the ground-view image and the aerial-view image match each other when the computed similarity is greater than or equal to a predetermined threshold.

13. A non-transitory computer-readable storage medium storing a program that causes a computer to execute:

acquiring a ground-view image, an aerial-view image, a ground depth image, and an aerial depth image, the ground depth image being an image that indicates a distance from a ground camera to each location captured in the ground-view image, and the aerial depth image being an image that indicates a distance from a center location captured in the aerial-view image to each location captured in the aerial-view image, extracting features from the ground-view image and the ground depth image to compute a ground feature;

extracting features from the aerial-view image and the aerial depth image to compute an aerial feature; and determining whether or not the ground-view image and the aerial-view image match each other using the ground feature and the aerial feature, wherein the acquisition of the aerial depth image comprises:

generating the aerial depth image by computing a distance between each pixel of the aerial image and a center of the aerial image and setting, to each pixel of the aerial depth image, a value proportional to the computed distance between that pixel and the center of the aerial depth image; and acquiring the generated aerial depth image.

14. The storage medium according to claim 13, wherein the determination of whether or not the ground-view image and the aerial-view image match each other comprises:

computing a similarity between the ground feature and the aerial feature; and determining that the ground-view image and the aerial-view image match each other when the computed similarity is greater than or equal to a predetermined threshold.

15. The storage medium according to claim 13, further storing a first model and a second model, the first model being trained to extract features from the ground-view image and the ground depth image to output the ground feature, the second model being trained to extract features from the aerial-view image and the aerial depth image to output the aerial feature, wherein the program further causes the computer to execute:

acquiring a training dataset that comprises the ground-view image, the ground depth image, a positive example of an aerial-view image, a negative example of an aerial-view image, and the aerial depth image;

inputting the ground-view image and the ground depth image to the first model to obtain the ground feature;

inputting the positive example of the aerial-view image and the aerial depth image to the second model to obtain an aerial feature of the positive example;

inputting the negative example of the aerial-view image and the aerial depth image to the second model to obtain an aerial feature of the negative example; and updating trainable parameters of the first model and the second model based on the ground feature, the aerial feature of the positive example, and the aerial feature of the negative example.

16. The storage medium according to claim 15, wherein the program further causes the computer to execute:

modifying the ground-view image in the training dataset by determining pixels of the ground depth image in the training dataset that indicate a distance larger greater than a predetermined threshold, and modifying pixels of the ground-view image corresponding to the determined pixels of the ground depth image.

17. The storage medium according to claim 13, further storing a first model and a second model, the first model being trained to extract features from the ground-view image and the ground depth image to output the ground feature, the second model being trained to extract features from the aerial-view image and the aerial depth image to output the aerial feature, wherein the program further causes the computer to execute:

acquiring a training dataset that comprises the aerial-view image, a positive example of the ground-view image, a negative example of the ground-view image, the aerial depth image, a ground depth image corresponding to the positive example, and a ground depth image corresponding to the negative example;

inputting the aerial-view image and the aerial depth image into the second model to obtain the aerial feature;

inputting the positive example and the ground depth image corresponding to the positive example into the first model to obtain a ground feature of the positive example;

inputting the negative example and the ground depth image corresponding to the negative example into the first model to obtain a ground feature of the negative example; and updating trainable parameters of the first model and the second model based on the aerial feature, the ground feature of the positive example, and the ground feature of the negative example.

* * * * *